(12) United States Patent
Hahn et al.

(10) Patent No.: US 9,717,974 B2
(45) Date of Patent: Aug. 1, 2017

(54) POLE AND SUPPORT BASE ASSEMBLY

(71) Applicant: Indian Industries, Inc., Evansville, IN (US)

(72) Inventors: Ryan Hahn, Dieterich, IL (US); James Eaton, Sleepy Hollow, IL (US)

(73) Assignee: Indian Industries, Inc., Evansville, IN (US)

(*) Notice: Subject to any disclaimer, the term of this patent is extended or adjusted under 35 U.S.C. 154(b) by 13 days.

(21) Appl. No.: 14/926,028

(22) Filed: Oct. 29, 2015

(65) Prior Publication Data

US 2016/0123522 A1 May 5, 2016

Related U.S. Application Data

(60) Provisional application No. 62/072,003, filed on Oct. 29, 2014.

(51) Int. Cl.
*F16M 13/00* (2006.01)
*A63B 71/02* (2006.01)
(Continued)

(52) U.S. Cl.
CPC ............ *A63B 71/023* (2013.01); *A63B 61/02* (2013.01); *E04H 12/2238* (2013.01); *E04H 12/2269* (2013.01); *A63B 2069/0008* (2013.01); *A63B 2071/026* (2013.01); *A63B 2102/04* (2015.10); *A63B 2102/18* (2015.10); *A63B 2210/50* (2013.01); *A63B 2243/0095* (2013.01); *E04H 12/22* (2013.01); *E04H 12/2246* (2013.01); *E04H 12/2253* (2013.01); *F16B 5/10* (2013.01); *F16B 21/02* (2013.01); *F16B 21/04* (2013.01);
(Continued)

(58) Field of Classification Search
CPC .. F16B 21/02; F16B 21/04; F16B 5/10; E04H 12/22; E04H 12/2253; E04H 12/2269; E04H 12/2261; E04H 12/2238; E04H 12/2246; F16M 2200/08; F16M 11/16; F16M 11/041; A63B 2071/026; A63B 2210/50; A63B 61/02; A63B 71/023; A63B 2069/0008
USPC ....... 248/158, 418, 519, 523, 121, 159, 910; 411/341, 342, 343, 347, 552, 349, 551
See application file for complete search history.

(56) References Cited

U.S. PATENT DOCUMENTS 2,291,975 A * 8/1942 Minero .................. A47B 13/06
24/DIG. 53
2,391,288 A * 12/1945 Barlow .................... F16B 5/10
411/349

(Continued)

*Primary Examiner* — Brian Mattei
*Assistant Examiner* — Taylor Morris
(74) *Attorney, Agent, or Firm* — Woodard, Emhardt, Moriarty, McNett & Henry, LLP; Charles Meyer

(57) ABSTRACT

Certain embodiments of the present disclosure describe a pole and base assembly. The pole and base assembly includes a pole with an upper engagement portion and a lower engagement portion that are biased toward each other. A base includes a socket to receive the pole and a channel that allows the lower engagement portion to pass through the base. The upper engagement portion is retained on the top surface of the base. When the lower engagement portion is passed through the socket and aligned with a locking portion, the biasing force causes the upper and lower engagement portions to clamp together around the base and lock the pole to the base.

18 Claims, 4 Drawing Sheets

(51) Int. Cl.

| | | |
|---|---|---|
| *A63B 61/02* | (2006.01) | |
| *F16L 3/00* | (2006.01) | |
| *F16B 21/00* | (2006.01) | |
| *B25G 3/16* | (2006.01) | |
| *F16B 7/20* | (2006.01) | |
| *F16B 21/04* | (2006.01) | |
| *F16B 5/10* | (2006.01) | |
| *E04H 12/22* | (2006.01) | |
| *F16M 11/16* | (2006.01) | |
| *F16B 21/02* | (2006.01) | |
| *F16M 11/04* | (2006.01) | |
| *A63B 69/00* | (2006.01) | |
| *A63B 102/04* | (2015.01) | |
| *A63B 102/18* | (2015.01) | |

(52) U.S. Cl.
 CPC ............ *F16M 11/041* (2013.01); *F16M 11/16* (2013.01); *F16M 2200/08* (2013.01)

(56) References Cited

U.S. PATENT DOCUMENTS

| | | | | |
|---|---|---|---|---|
| 2,599,207 A * | 6/1952 | Spahr | ........................ | F16B 5/10 411/349 |
| 3,485,201 A | 12/1969 | Kelley | | |
| 3,554,075 A * | 1/1971 | Johnson | .................. | F16B 21/04 411/349 |
| 3,599,924 A * | 8/1971 | Schmidgall | ............. | E01F 9/688 248/158 |
| 3,963,361 A | 6/1976 | Schenk | | |
| 4,515,499 A | 5/1985 | Furiate | | |
| 4,718,624 A * | 1/1988 | Greulich | ............ | F16M 11/2021 248/158 |
| 4,989,911 A | 2/1991 | Van Order | | |
| 5,002,418 A * | 3/1991 | McCown | ................ | B64G 1/641 24/287 |
| 5,871,222 A | 2/1999 | Webb | | |
| 5,997,205 A | 12/1999 | Koide | | |
| 6,126,359 A | 10/2000 | Dittrich et al. | | |
| 6,338,649 B1 * | 1/2002 | Smith | ................... | H01R 11/287 411/552 |
| 6,612,534 B2 | 9/2003 | Hennessey | | |
| 6,820,842 B1 * | 11/2004 | Chuang | ............... | A47B 96/1425 248/125.8 |
| 7,147,399 B2 | 12/2006 | Viscount et al. | | |
| 7,186,192 B1 * | 3/2007 | Suissa | ................ | A63B 69/0079 473/423 |
| 7,674,194 B2 * | 3/2010 | Lortscher | ........... | A63B 69/0002 473/417 |
| 8,007,196 B2 | 8/2011 | Whitling et al. | | |
| 2003/0111657 A1 * | 6/2003 | Green | ..................... | A47F 10/00 256/45 |
| 2006/0113514 A1 * | 6/2006 | Prismall | ................ | E01F 13/028 256/1 |
| 2010/0108830 A1 * | 5/2010 | Wang | ..................... | F16D 1/112 248/158 |
| 2013/0192149 A1 * | 8/2013 | Roach | ................ | E04H 12/2269 52/165 |

* cited by examiner

POLE AND SUPPORT BASE ASSEMBLY

CROSS REFERENCE TO RELATED APPLICATIONS

This application claims the benefit of U.S. Provisional Application No. 62/072,003 filed Oct. 29, 2014, which is hereby incorporated by reference in its entirety.

FIELD OF THE INVENTION

Aspects of the present invention deal with poles and assembly of a pole with a base.

BACKGROUND OF THE INVENTION

Pole support and base assemblies can be used for many purposes ranging from being used with straps and ropes to define queuing lines to being used as uprights for net sports such as volleyball or badminton. The sometimes temporary nature of these structures and the need to store them makes it beneficial for the pole to be able to be removed from the base. Aspects of the present disclosure address a type of pole and base structure that is easy to assemble and disassemble.

SUMMARY OF THE INVENTION

In certain embodiments, a pole is used which has two engagement portions adjacent the bottom of the pole. The lower engagement portion and the upper engagement portion protrude from the diameter of the pole. In some embodiments, the upper engagement portion extends across the pole through two vertical slots which allows the upper engagement portion to move upward or downward between the travel limits of the slots. The lower engagement portion extends across the pole through two holes which restrict the lower engagement portion from moving along the longitudinal axis of the pole. A biasing force pulls the portions together so that the upper engagement portion is biased to the lower ends of the slots.

In an assembly step, the lower end of the pole is introduced into a socket or similar fitting in a base. The base and socket define a channel which allows the lower engagement portion on the pole to travel through the base without resistance to a point where the upper engagement portion engages the base. Downward force can then be applied to the pole, causing it to travel vertically downward relative to the upper engagement portion, against the biasing force, until the lower engagement portion reaches a point of clearance with respect to the socket. The pole is then rotated, for example 90°, to align the lower engagement portion with a locking portion in the base. The downward force on the pole is then released, allowing the biasing force to pull the lower engagement portion and pole upward until the lower engagement portion engages the locking portion. The pole is then preferably in a configuration for use. When disassembly is desired, the pole is pushed downward to disengage the lower engagement portion from the locking portion and the pole is rotated in the reverse direction until the lower engagement portion is aligned with the channel, so that the pole end can be lifted vertically to exit the base.

Additional objects and advantages of the described embodiments are apparent from the discussions and drawings herein.

DESCRIPTION OF PREFERRED EMBODIMENTS

Figure 3:
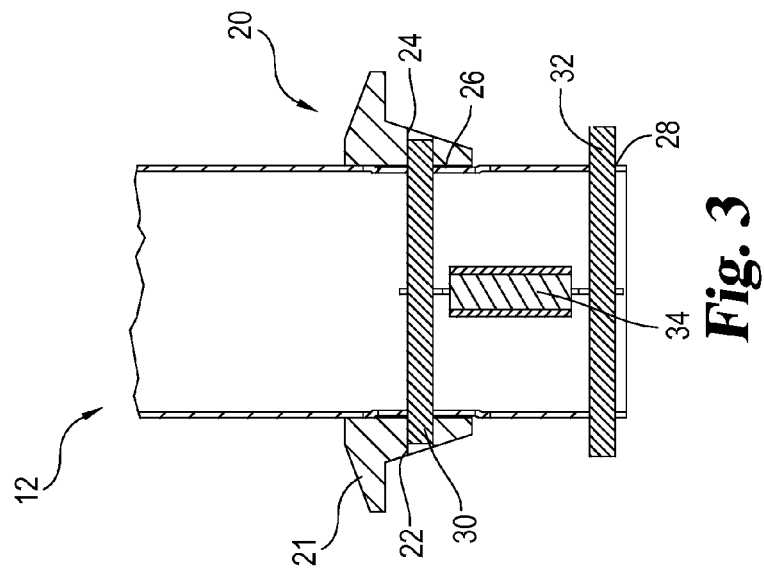
FIG. 3 is a side, cross-sectional view of a portion of the pole of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Certain embodiments include a quick assembly pole and base assembly for various types of uses. For example, these embodiments may be used with straps or ropes to form temporary queuing lines or for uprights for a volleyball net. In certain embodiments, the pole support and base assembly includes a pole with a diameter. An upper engagement portion, such as a pin, protrudes beyond the diameter of the pole. The upper engagement portion is slidable relative to the length of the pole. A lower engagement portion, which could also be a pin, protrudes beyond the diameter of the pole and is prevented from moving vertically along the pole. The upper engagement portion is biased toward the lower engagement portion, for example by using a spring that is attached between the lower engagement portion and the upper engagement portion.

In assembly, the pole is fit into a socket in the base. Downward force on the pole causes the pole to travel downward through the socket. The base engages the upper engagement portion and prevents the upper engagement portion from passing through the base while the pole continues to move, causing the upper engagement portion to slide toward its upper limit along the height of the pole. The pole is pushed downward until the lower engagement portion reaches a point of clearance between the lower engagement portion and the socket. The pole is rotated to align the lower engagement portion with a locking portion. This locking portion, for example, could be notches in the base in which the lower engagement portion may nest. In other embodiments, the locking portion may consist of protrusions from the base that do not allow rotation of the pole past a certain location. When the downward force on the pole is released, the bias between the lower engagement portion and the upper engagement portion clamps the base between them and locks the pole to the base.

Figure 1:
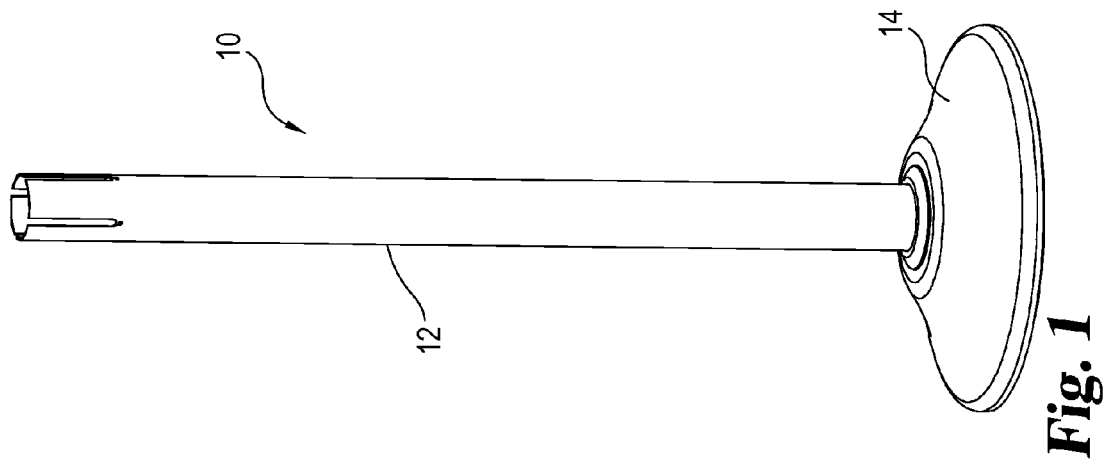
FIG. 1 is a perspective view of an embodiment of a pole and base assembly.

FIG. 1 illustrates an example of a pole support and base assembly generally designated as 10. The assembly 10 includes a pole 12 and a base 14. When assembled, pole 12 is inserted into an opening in base 14, and extends vertically.

Pole 12 and base 14 may be constructed from a variety of materials. For example, pole 12 and base 14 may be made from metal such as aluminum or steel, plastic, or wood. Optionally, base 14 is made by a molding process. In some embodiments, base 14 is designed to have no undercuts and may be cast or molded with a conventional two part mold. Base 14 is preferably designed with angles and clearances which are arranged so that base 14 can be formed in and removed from a simple two piece mold without inserts or a side-action and without needing post-mold machining.

Assembly 10 may be used for a variety of purposes. For example, in one embodiment, assembly 10 may be configured to designate queuing lines where the top of pole 12 has attachments for barrier ropes, chains or straps. Optionally, a rope, chain or strap can be stored on or within the pole, for example within the interior or on a retractable reel. In other embodiments, assembly 10 may be used as stanchions for net games such as volleyball or badminton or used as a batting tee, a flagpole or a sign post. In these embodiments, one or more attachments to pole 12 may provide connections for a net, banner, flag, or other objects. Assembly 10 can be used in different orientations, with pole 12 typically parallel to a base socket, and typically but not necessarily perpendicular to a base support surface.

Figure 2:
FIG. 2 is an exploded view of the pole of FIG. 1.

FIG. 2 illustrates an exploded view of pole 12 according to certain embodiments of the invention. As shown, a lower end of pole 12 includes two sets of openings. As an example, one set of openings may be a set of vertical slots 26, and a second set of openings may be a set of holes 28. However, it is not required that holes 28 be found closer to the bottom of pole 12 than vertical slots 26 In other embodiments, the vertical slots may be positioned closer to the bottom of pole 12 than the set of holes.

Pole 12 includes an upper engagement portion and a lower engagement portion. In FIG. 2, upper engagement portion and lower engagement portion are shown as including removable pins 30, 32; however, in other embodiments, the upper and lower engagement portions may be permanent structures on pole 12 or any other suitable component that protrudes from the diameter of pole 12. Pole 12 also includes a biasing member, represented as spring 34.

A bushing 20 is positioned around pole 12 as part of the upper engagement portion. Bushing 20 may be circular. In the view shown in FIG. 2, bushing 20 is illustrated above its normal location to allow vertical slots 26 to be seen. FIG. 3 shows the normal position of bushing 20 in an assembled configuration on pole 12 that includes pins 30, 32 and spring 34. The cross-sectional view of FIG. 3 shows the interior details of the pins 30, 32 and spring 34 within pole 12.

Bushing 20 fits around pole 12 near the end that is inserted into base 14. Bushing 20 has a bottom portion 22 and a top portion 21 where the diameter of top portion 21 is larger than the diameter of bottom portion 22. There are two bushing holes 24 located on bottom portion 22 of bushing 20. In some embodiments, bushing holes 24 are diametrically opposed.

Bushing 20 is positioned on pole 12 to align bushing holes 24 with vertical slots 26. Upper pin 30 fits into slots 26 and bushing holes 24. Slots 26 are sized to allow upper pin 30 to slide upward or downward within the limits of slots 26. In other embodiments, two pin pieces or other suitable connectors could be used to slidably secure bushing 20 on pole 12.

In some embodiments, bushing 20 may be any suitable object and/or shape that engages the top surface of base 14 and prevents the upper engagement portion from passing through base 14. Other embodiments may not require a bushing 20. The upper engagement portion may be sized to directly engage the top surface of base 14 without using a bushing.

Lower holes 28 are positioned below slots 26, near the base of pole 12. Lower pin 32 fits through holes 28 so that lower pin 32 extends through pole 12 and protrudes beyond the diameter of pole 12. Lower pin 32 is sized so that a portion of lower pin 32 projects outward from both sides of pole 12. Alternately, in other embodiments, two pins or other extension pieces that protrude from the diameter of pole 12 could be used. The diameter of lower holes 28 is approximately the diameter of lower pin 32 to allow lower pin 32 to pass through holes 28, but to constrain lower pin 32 from moving vertically.

A biasing force is used to pull the upper and lower engagement portions toward each other. In some embodiments, the biasing force may be provided by a spring 34. Spring may be arranged inside pole 12 and extends between upper pin 30 and lower pin 32. An upper connection on spring 34 connects to upper pin 30 and a lower connection on spring 34 connects to lower pin 32. When connected, spring 34 pulls pins 30, 32 together, biasing upper pin 30 toward a position closer to lower pin 32. Spring 34 can be any variety of spring or biasing member, with elastic as an alternative, that stretches under tension when a load is applied causing spring 34 to pull pins 30, 32 together or to move the lower pin and pole relative to the upper pin when the load is released.

Figure 4:
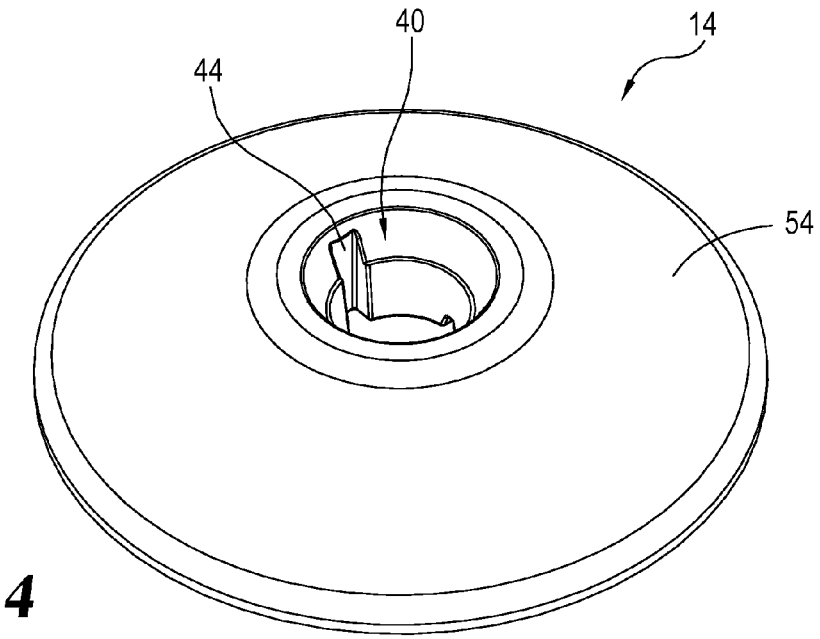
FIG. 4 is a top perspective view of a base from the pole and base assembly of FIG. 1.
Figure 5:
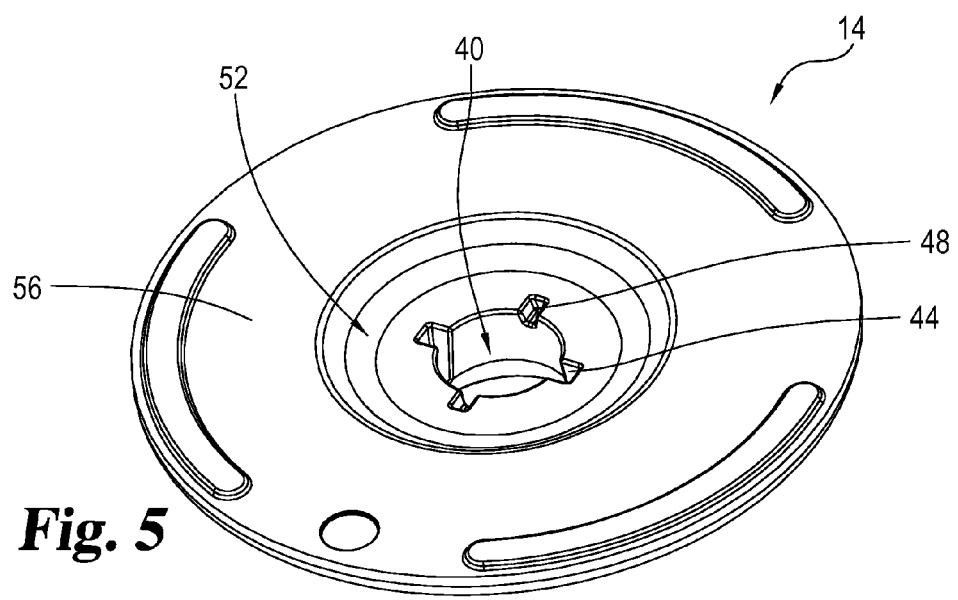
FIG. 5 is a bottom perspective view of the base.
Figure 6:
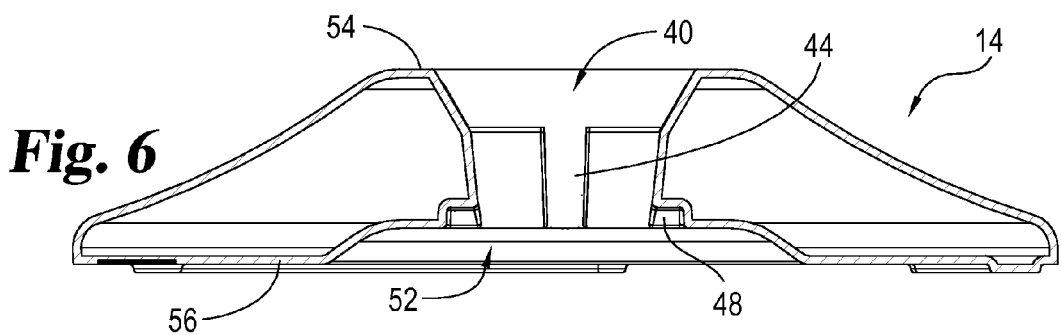
FIG. 6 is a cross-sectional side view of the base.

FIGS. 4-6 illustrate various views of base 14 according to certain embodiments of the invention. As shown, base 14 has a circular shape; however, in other embodiments the shape of base 14 may vary. For example base 14 could be square, rectangular, hexagonal, or any other shape that sufficiently supports pole 12. Base 14 typically includes a top surface 54 and a bottom surface 56. Alternately base 14 could be an integrated part of a larger structure, such as a socket in a floor, platform or wall.

As seen in FIG. 4, a socket 40 is defined through at least a portion of base 14, creating an opening in base 14. Socket 40 may extend through the depth of base 14, or in some embodiments, socket 40 extends only partially through the depth of base 14. Socket 40 is shaped so pole 12 may be inserted into base 14 by fitting pole 12 into socket 40. In some embodiments, socket 40 is shaped to substantially match the cross section of pole 12.

Channels 44 are positioned on the sides of socket 40 to match the orientation of lower pin 32. For example, if lower pin 32 fits into diametrically opposed holes 28, channels 44 will be positioned on diametrically opposed sides of socket 40. Typically, channels 44 extend the entire height of socket 40. The channels 44 are sized to allow pin 32 to slide through base 14 when lower pin 32 is aligned with channels 44. Other embodiments may include only one channel 44 or may include more than two channels.

FIG. 5 shows a bottom perspective view of base 14. As seen in this view, the bottom side of socket 40 defines a locking portion, such as notches 48. Notches 48 are positioned around socket 40 to correspond to the orientation of the protrusion of lower pin 32 from pole 12. For example, in the embodiment shown, notches 48 are on diametrically opposed sides of socket 40 because lower pin 32 protrudes from diametrically opposed sides of pole 12. In the embodiment shown, notches 48 are offset approximately 90 degrees from channels 44. However, in other embodiments the spacing between notches 48 and channels 44 may be different. The length across and including notches 48 is approximately the same as the length of lower pin 32 so lower pin 32 fits within notches 48 when aligned. The depth of notches 48 is less than the depth of socket 40, so if pole 12 is pulled upward when lower pin 32 is aligned with and fit into notches 48, lower pin 32 will contact the top of notches 48 and prevent pole 12 from being removed from base 14.

Optionally, on the bottom side of base 14, a cavity 52 is defined around socket 40 so the end of socket 40 is positioned in height above the outer edges of base 14. Cavity 52 provides an empty volume underneath socket 40 when base 14 is placed on a support surface (see FIG. 6) allowing space for pole 12 and lower pin 32 to extend through socket 40 and to rotate when base 14 is positioned on the ground. In the embodiment shown, cavity 52 is open to the exterior of the base 14. In other embodiments, the bottom surface of base 14 may extend over cavity 52 so that cavity 52 is entirely enclosed within the interior of base 14.

Cavity 52 provides a point of clearance between lower engagement portion 32 and socket 40 where pole 12 is able to rotate while a portion of pole 12 is located within socket 40. In other embodiments, it is not required that the point of clearance point is positioned in a cavity past bottom surface 56 of base 14 and past the end of socket 40. A point of clearance may be at any height along base socket 40 where pole 12 is able to rotate. For example, there may be a radial groove within base 14 located in a plane perpendicular to the longitudinal axis of socket 40 that allows pole 12 to rotate when lower pin 32 is aligned with the radial groove.

In use, pole 12 is assembled by aligning bushing holes 24 with vertical slots 26. Upper pin 30 is inserted into bushing holes 24 and slots 26 so that upper pin 30 extends across pole 12 and slidably secures bushing 20 to pole 12. Lower pin 32 is then inserted into lower holes 28 so that it extends across pole 12. During or after insertion of the pins, spring 34 is attached to upper pin 30 and lower pin 32 so it extends between the pins and pulls upper pin 30 downward toward lower pin 32. This biases upper pin 30 to the lower end of slots 26.

Figure 7:
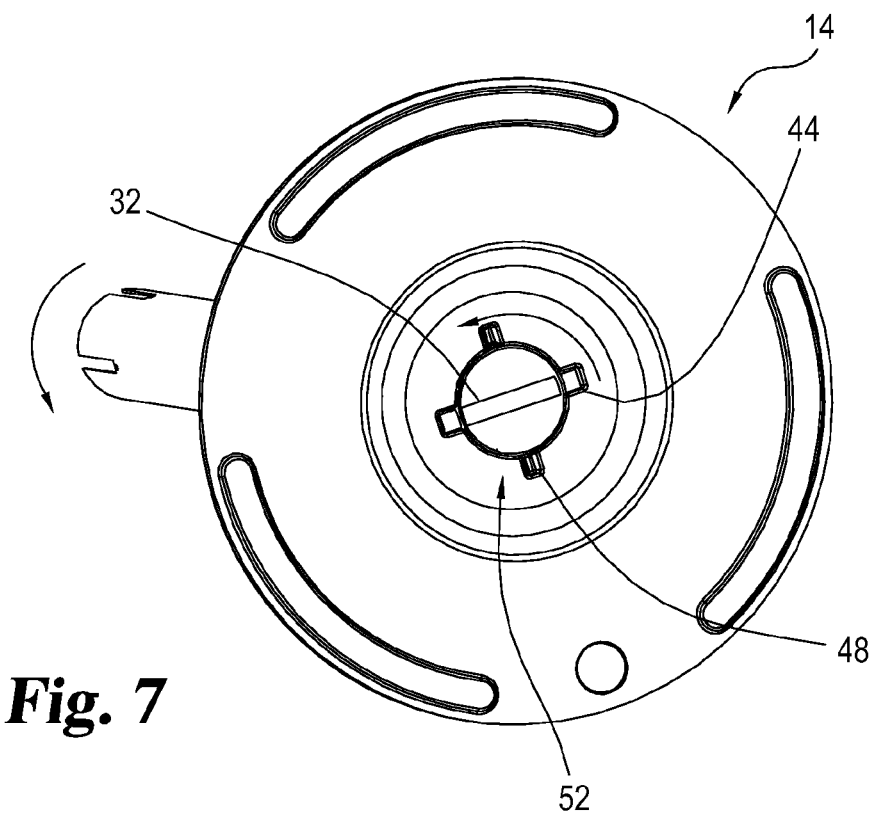
FIG. 7 is a flowchart for a method of attaching a pole to a base.

A flowchart 100 shown in FIG. 7 illustrates a method of attaching pole 12 to base 14 after pole 12 has been assembled. The lower end of the pole 12 is introduced 105 into socket 40 and lower pin 32 is aligned 110 with channels 44 in base 14. Force is applied 115 on pole 12 to cause the lower end of pole 12 to travel through socket 40 without resistance. Preferably the diameter of bushing upper portion 21 is larger than socket 40 so that bushing 20 contacts and is held in place by base 14 once pole 12 is inserted to a certain depth within socket 40. Alternately, upper pin 30 may contact base 14 if bushing 20 is not used.

Figure 8:
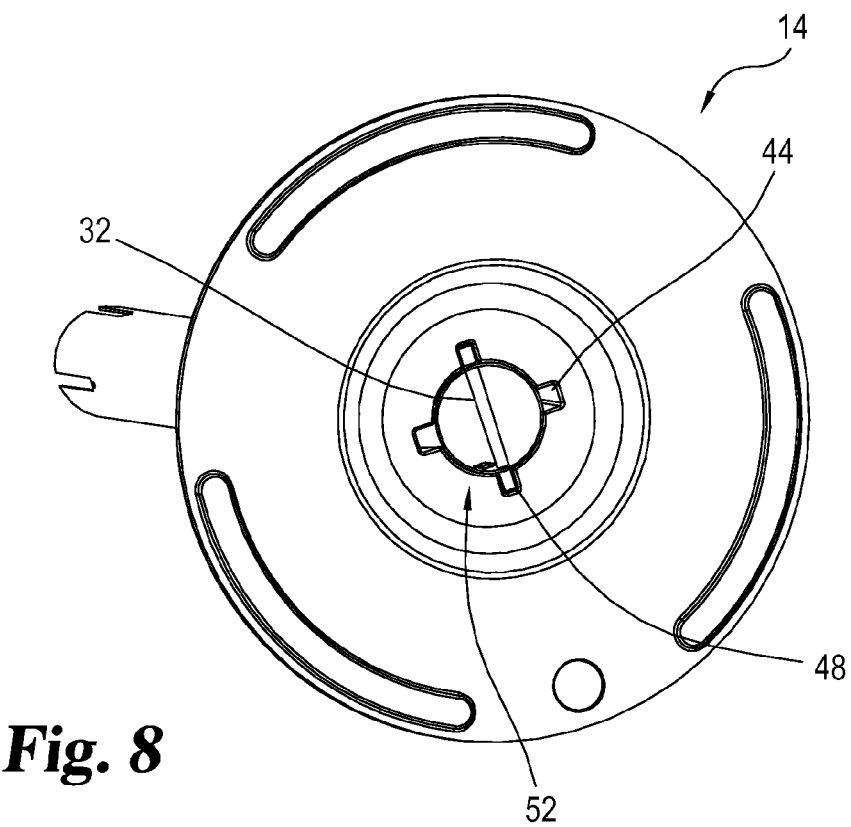
FIG. 8 is a bottom perspective view of the pole and base assembly of FIG. 1 in an unlocked position.

After the upper engagement portion such as bushing 20 or upper pin 30 is retained on the top surface of base 14, the user continues applying downward force 120 on pole 12, causing pole 12 to travel a slight distance further through socket 40. Because bushing 20 or upper pin 30 is too large to move through socket 40, the upper engagement portion stays in the same position relative to base 14 and socket 40. This causes spring 34 to stretch, moving upper pin 30 upward in vertical slots 26 as pole 12 and lower pin 32 continue to travel downward relative to upper pin 30. Pole 12 is pushed downward until lower pin 32 reaches a point of clearance. As an example, this point of clearance may be where lower pin 32 passes through socket 40 and into cavity 52 (see FIG. 8).

Figure 9:
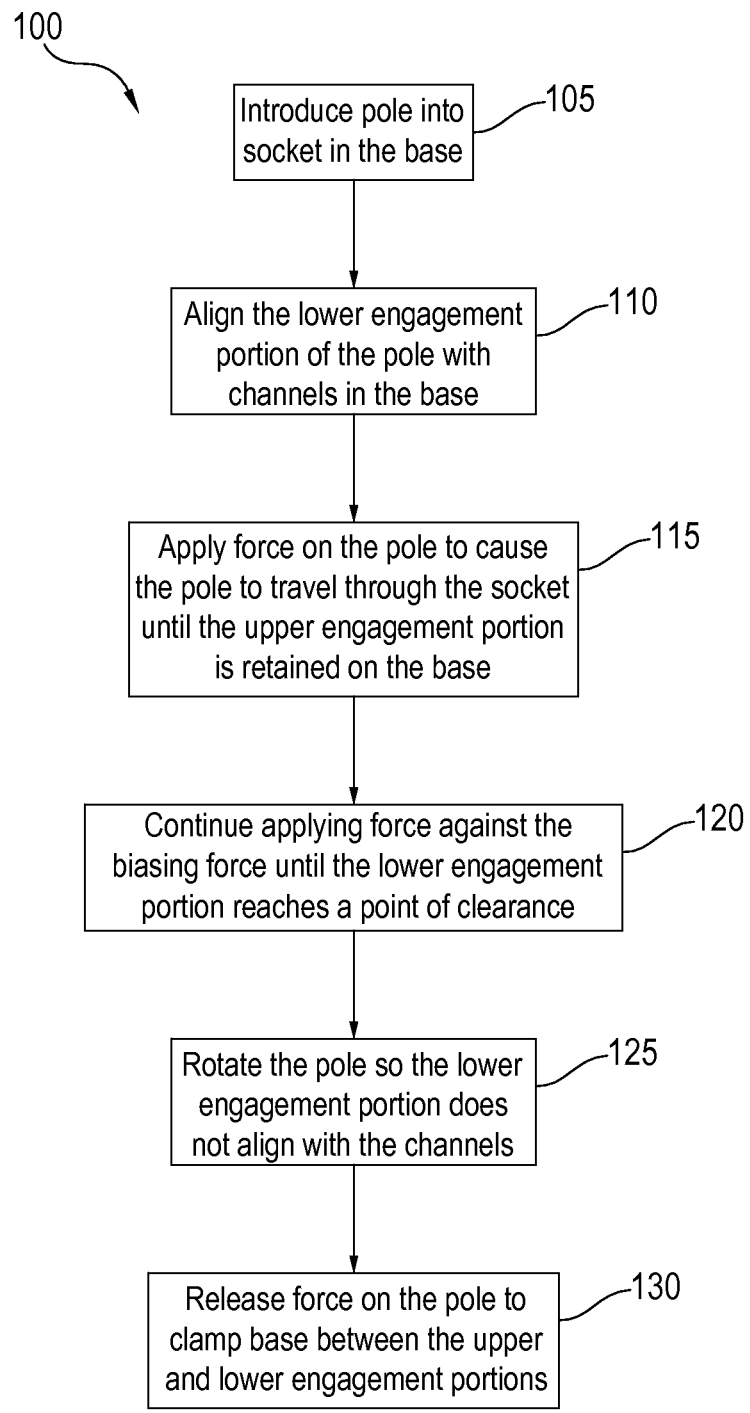
FIG. 9 is a bottom perspective view of the pole and base assembly of FIG. 1 in a locked position.

Pole 12 is then rotated 125 until lower pin 32 aligns with a locking portion, such as notches 48, on base 14 (see FIG. 9). The user then releases 130 the downward force on pole 12, allowing spring 34 to pull lower pin 32 and pole 12 upward so lower pin 32 engages and nests within notches 48, locking pole 12 into an upright position on base 14.

To disassemble pole and base assembly 10, the user applies downward force to pole 12 to disengage lower pin 32 from notches 48 and rotates pole 12 to align lower pin 32 with channels 44. Once lower pin 32 is aligned with channels 44, the user may pull pole 12 upward to remove pole 12 from socket 40 and base 14.

Other similar embodiments may vary the slot and hole arrangement or the position of the bushing. In some embodiments, the position of slots 26 and holes 28 may be reversed so slots 26 are positioned closer to the bottom of pole 12 than holes 28. As an example, upper pin 30 is inserted into holes 28 and extends through pole 12. Lower pin 32 is inserted into bushing holes 24 and slots 26 and extends through pole 12. Spring 34 is attached to upper pin 30 and lower pin 32 and biases lower pin 32 to the top of slots 26. Notches 48 are on the top side of socket 40 and base 14 rather than the bottom of socket 40. In this embodiment, the user inserts pole 12 into the bottom of socket 40 so upper pin 30 is aligned with channels 44. Pole 12 travels upward through socket 40 without resistance until bushing 20 contacts the underside of base 14. The user continues to apply upward force on pole 12, causing spring 34 to stretch and lower pin 32 to move downward in slots 26 as pole 12 continues to travel a slight distance through socket 40. Once upper pin 30 emerges from channels 44 on the top side of socket 40, the user rotates pole 12 so upper pin 30 aligns with notches 48 on the top side of base 14. When the user releases the pulling force on pole 12, spring 34 pulls upper pin 30 downward, toward lower pin 32, so that upper pin 30 engages and nests within notches 48, locking pole 12 into an upright position on base 14. To remove pole 12 from base 14 in this embodiment, the user pulls upward on pole 12 so upper pin 30 is no longer nested within notches 48 and then rotates pole 12 to align upper pin 30 with channels 44. Base 14 may then be pulled upward along the length of pole 12 to be removed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A pole and base assembly comprising:
   a pole with a diameter, wherein said pole includes an upper engagement portion extending through a pair of vertical slots defined in said pole, protruding beyond said pole diameter and slidable along said pole within said vertical slots, and said pole includes a lower engagement portion protruding beyond said pole diameter at a fixed height on said pole, wherein said upper engagement portion is biased toward said lower engagement portion;
   a base with a top surface wherein said base includes a socket to receive said diameter of said pole, a channel to allow said lower engagement portion of said pole to pass through said base when said pole is placed through said socket, and a locking portion;
   wherein said base top surface engages said upper engagement portion and prevents said upper engagement portion from passing through said base when said pole is placed downward through said socket;
   wherein sliding movement of said upper engagement portion by urging said pole through said socket against said biasing force allows said pole to pass through said socket a sufficient distance to reach a point of clearance between said lower engagement portion and said socket; and, wherein said locking portion is adapted to receive said lower engagement portion, enabling said upper and lower engagement portions to clamp said base between them when the force against the biasing force is released, locking said pole to said base.

2. The pole and base assembly of claim 1, wherein said upper engagement portion comprises a pin and opposing ends of said pin protrude from said pole diameter.

3. The pole and base assembly of claim 1, wherein said lower engagement portion comprises a pin and opposing ends of said pin protrude from said pole diameter.

4. The pole and base assembly of claim 1, wherein said pole includes holes and said lower engagement portion is arranged through said holes so that said lower engagement portion is restricted from sliding vertically in said holes.

5. The pole and base assembly of claim 1, wherein said upper engagement portion comprises:
a bushing positioned around said pole, wherein said bushing includes bushing holes; and,
wherein said bushing holes are positioned on said bushing to align with said vertical slots, and wherein said bushing is engaged with a pin extending through said bushing holes and said slots.

6. The pole and base assembly of claim 5, wherein said bushing includes a top portion with a diameter, and wherein the diameter of said top portion is larger than the diameter of said socket.

7. The pole and base assembly of claim 1, wherein said locking portion comprises a notch defined in a bottom surface of said base along the perimeter of said socket.

8. The pole and base assembly of claim 7, wherein said locking portion is positioned on said bottom surface of said base and offset with respect to said channel so that said pole is rotated after said lower engagement portion clears said bottom surface for said lower engagement portion to be received in said locking portion.

9. A pole and base assembly comprising:
a pole defining a first set of openings and a second set of openings;
an upper engagement portion and a lower engagement portion;
a spring including two ends;
a base with a top surface and a bottom surface and including a socket with a perimeter, wherein said base defines a set of channels positioned along said perimeter of said socket, and wherein said socket defines a set of notches on said bottom surface along said perimeter of said socket, wherein said notches are offset from said channels;
wherein said upper engagement portion extends across said pole through said first set of openings, wherein said first set of openings is a set of vertical slots wherein said upper engagement portion can move vertically within limits defined by said vertical slots, wherein said lower engagement portion extends across said pole through said second set of openings, and wherein one end of said spring is attached to said upper engagement portion and one end of said spring is attached to said lower engagement portion to bias said upper engagement portion toward said lower engagement portion;
wherein said pole is adapted to be slidable within said socket when said lower engagement portion is aligned with said channels so that said lower engagement portion can be slid a sufficient distance through said socket to provide clearance from said bottom surface while said upper engagement portion is prevented from passing through said socket by said top surface of said base; and
wherein when said lower engagement portion is aligned with said notches, said spring biases said lower engagement portion into said notches toward said upper engagement portion so that said engagement portions clamp the base between them to lock said pole to said base.

10. The pole and base assembly of claim 9, wherein said channels extend through said base, from said top surface to said bottom surface.

11. The pole and base assembly of claim 9, wherein said notches only extend through a portion of the height of said base.

12. The pole and base assembly of claim 9, wherein said second set of openings is a set of holes and said lower engagement portion is restricted from moving vertically relative to said pole.

13. The pole and base assembly of claim 9, wherein said upper engagement portion comprises a bushing positioned around said pole.

14. A method of attaching a pole to a base comprising the acts of:
inserting a pole into a socket in a base having a top surface, wherein said pole includes an upper engagement portion extending through a pair of vertical slots defined in said pole and protruding from said pole diameter and a lower engagement portion protruding from said pole diameter, and wherein said upper engagement portion is biased toward said lower engagement portion by a biasing force;
advancing said pole downward through said socket so said lower engagement portion travels through channels defined in said base until said upper engagement portion is retained on said base top surface preventing the upper engagement portion from passing through said base while allowing said pole to continue to move;
applying force on said pole against said biasing force causing said pole to further travel relative to said upper engagement portion and through said socket until said lower engagement portion reaches a point of clearance from said socket;
rotating said pole so said lower engagement portion is not aligned with said channels;
releasing the force on said pole so that the biasing force causes said lower engagement portion and said upper engagement portion to clamp said base between them to lock said pole to said base.

15. The method of claim 14, wherein said upper engagement portion comprises a pin that extends through said vertical slots.

16. The method of claim 14, wherein said lower engagement portion comprises a pin that extends through a set of holes in said pole.

17. The method of claim 14, wherein said biasing force is provided by a spring connected between said upper engagement portion and said lower engagement portion.

18. The method of claim 14, wherein said lower engagement portion engages notches defined in a bottom surface of said base when the applied force is released.

* * * * *